United States Patent [19]

Kaye

[11] 3,713,870
[45] Jan. 30, 1973

[54] METHOD OF DEPOSITING METALLIC FLAKES
[75] Inventor: Melvin S. Kaye, Short Hills, N.J.
[73] Assignee: Maas & Waldstein Co.
[22] Filed: March 6, 1970
[21] Appl. No.: 17,346

Related U.S. Application Data

[63] Continuation-in-part of Ser. No. 664,609, Aug. 31, 1967, abandoned.

[52] U.S. Cl............117/71 R, 117/71 M, 117/123 A, 117/124 C, 117/131, 117/160 R
[51] Int. Cl..........B44d 1/06, B44d 1/14, B44d 1/02
[58] Field of Search.......117/71 M, 71 R, 35 R, 35 S, 117/31, 131, 160 R, 123 B, 124 C, 72, 75, 123 A

[56] References Cited

UNITED STATES PATENTS

| | | | |
|---|---|---|---|
| 859,062 | 7/1907 | Hendley | 117/123 B X |
| 2,280,135 | 4/1942 | Ward | 117/31 X |
| 3,286,604 | 11/1966 | De Vries | 117/31 X |
| 645,197 | 3/1900 | Alefeld | 117/71 |

OTHER PUBLICATIONS

A.P.C. Application of Ferdinand Moog and Bruno Schlensog, Ser. No. 281,738, Published 5-11-43.

*Primary Examiner*—Alfred L. Leavitt
*Assistant Examiner*—Cameron K. Weiffenbach
*Attorney*—Bierman and Bierman and Jordan B. Bierman

[57] ABSTRACT

The present invention is directed to a method whereby thin metal flakes are deposited on a solid substrate or base. The method consists essentially in providing flakes which are very thin and relatively small and suspending them in a volatile organic liquid. The substrate is then brought into contact with the suspension in order to form a film which contains a certain number of flakes. When the substrate is removed from the suspension and the liquid is allowed to evaporate, the flakes attach themselves to the substrate by intermolecular attraction.

10 Claims, No Drawings

3,713,870

METHOD OF DEPOSITING METALLIC FLAKES

CROSS-REFERENCE TO A RELATED APPLICATION

This application is a continuation-in-part of Ser. No. 664,609 filed on Aug. 31, 1967, now abandoned.

BACKGROUND OF THE INVENTION

In the prior art, it was customary to reduce metal particles to a very small size, less than 300 mesh. They were incorporated in a vehicle which is essentially a solution of a resin and/or nitrocellulose in organic liquids in order to form a paint or lacquer which contains the metallic particles as a pigment. In such case, each particle is surrounded by the vehicle. The metal may be commonly aluminum and when used as a coating composition it adheres to the base, particularly by the adhesive quality of the resinous vehicles. Because of the presence of resins and/or nitrocellulose and plasticizers in the solid film, the article may tend to darken with time and the brilliance of the pigment is diminished.

In another prior method, a metal such as aluminum was heated to a temperature such as to vaporize it and the vapors were deposited upon a non-metallic powder, such as of mica. The latter was incorporated into a solution of shellac or other resin so that the resulting composition when coated on a base had a metallic lustre.

SUMMARY OF THE INVENTION

The present invention is intended to provide metallic flakes which are completely free from resinous materials, the flakes being used to provide decorative effects on suitable substrates such as wrapping paper, novelty fabrics, ribbons, objects made of glass, plastic, metal, ceramic, leather, rubber, and others. In the present invention, the flakes are large enough so as to be readily visible and they are preferably of irregular shape from about one-half inch in the largest dimension and down to about one-hundredth of an inch. Flakes of such size give a specific decorative effect which cannot be obtained in accordance with the prior art.

The vehicle or carrier is usually an organic solvent which is completely volatile. The exact nature of the solvent may vary and the choice is controlled by factors such as toxicity to human beings, flammability, cost, odor, rate of evaporation, shape of particles desired and compatibility with the surface to be decorated. Among such solvents are alcohols, ketones, hydrocarbons, ether, or esters. Examples of solvents are ethyl and butyl acetates, acetone and ethyl alcohol. Preferably, the solvents have boiling points below 100°C.

The metal flakes used in the invention are so thin that they are transparent by transmitting light. The limiting factor is that the flakes should not be so thin that the reflective efficiency begins to decrease. The flakes are from 1 to 10 m $\mu$ in thickness. In other words, the thickness of the flakes is preferably in the range of 10 to 100 Angstrom units.

DESCRIPTION OF THE PREFERRED EMBODIMENT

For practical purposes, one may start with metalized film that is commercially sold for the purpose of hot stamping. This metalized film commonly is available with the metal being either genuine gold or aluminum. Other metals might also be used. The metalized film consists of a base layer of cellulose nitrate, cellulose acetate, cellophane, or, most commonly, mylar film. On this film is deposited a "release layer" that is any one of many thermosensitive waxes. For the purposes of this invention, the "release layer" must be easily solvated in the solvent to be used in the stripping operation to be described below. On top of the "release layer" is deposited the metallic film, by any of the various methods such as vacuum metalizing, sputtering, electroplating, etc.

Normally, this metallized film product is sold with another layer, a "size coat", on top of the metallic film. The purpose of this "size coat" is to act as an adhesive, to help the bond when the film is used to "hot stamp" an object, for example, a book. The "size coat" ends up being between the leather and the metal. The "release layer" melts upon the application of heat, and facilitates the transfer of the metallic film from the plastic carrier base to the object being decorated. For the purpose of this invention, the "size coat" is superfluous, and should be omitted.

The flakes are prepared from the metallized film by merely soaking the film in the proper solvent. In less than a minute as the solvent penetrates the metallic film and attacks the release layer, the metallic film starts to wrinkle, and then separates completely from the plastic film base, in the form of large flakes. Gentle agitation will accelerate the separation, but vigorous agitation or scrubbing, will reduce the particle size excessively. After the metallic film has separated, the clear plastic film base is removed, and the resulting slurry is allowed to settle overnight. The flakes will settle into a soft, flocculent mass. The clear supernatant solvent is then decanted and reused in further stripping operations. In practice it has been found that the flakes resulting from the stripping of about 400–1,000 sq. ft. of gold film will make a slurry occupying a volume of about 1 gallon.

The mass may be further concentrated by centrifuging, or pouring through a fine screen to one-half or one-quarter of the volume, but additional handling reduces the size of the flakes. Naturally, the higher the density of the metal, the more compactly it will settle, all other factors being constant. For example, a slurry of aluminum flakes will occupy a larger volume than a slurry of gold flakes.

In some cases, the above-described decanted, concentrated slurry is too concentrated for the production of decorative effects. Depending upon the item, and the desired effect, this concentrated slurry is reduced with additional solvent, ranging from about equal parts to about 10 parts of solvent to 1 part of slurry.

The most practical manner of applying the slurry is by plunge-dipping the item rapidly in and out of the liquid, and then rotating the item until the solvent has evaporated, to ensure even distribution of the flakes. The parts also may be decorated by flowing the slurry on, by simply pouring it over the item, again rotating the item to provide even distribution.

After the solvent has evaporated and the flakes have securely adhered to the substrate, repeated applications are often desirable to increase the concentration of flakes on the surface. For example, by repeating the application, a complete mirror effect may be built up. The temperatures involved are ambient, but is accelerates the drying if the solutions, items, and/or air are warmed. Normally an item is dry enough, within a few minutes, to handle, pack or re-coat.

The following examples are illustrative of the invention, but they in no way shall be considered as limiting the scope thereof:

EXAMPLE 1

Aluminum metallized film is held on a suitable base with a release layer in the middle. The thickness is about 50 Angstrom units. To an area of about 600 sq. ft. of such leaf, there is added 1 gallon of ethyl acetate, the mass is gently agitated to release the leaf from the base and to cause it to break down into flakes having a maximum dimension of about one-half inch. A substrate of a stainless steel sheet is dipped into the suspension using a rotary or irregular motion.

It is removed and the solvent is allowed to evaporate, in part. The sheet is then re-dipped and the operation repeated until a continuous film is obtained. It is then hung in the air to allow complete evaporation of the solvent. The product is a non-breakable mirror.

EXAMPLE 2

Genuine gold metallized film of a thickness of 80 Angstrom units on the usual base is introduced into acetone in the proportion of about 800 sq. ft. of leaf to 1 gallon of acetone. The mixture is gently agitated to cause the leaf to go into suspension in the liquid and to form flakes of irregular shape. The glass bottle is dipped into the suspension, agitated therein, and then removed. It is held in a current of warm air to evaporate most of the solvent. A deposit of gold flakes is formed in a discontinuous pattern. The operation is repeated to produce the desired decorative effect. All of the solvent is evaporated and the gold flakes adhere strongly to the glass, so that they are not removable by moderate rubbing, the adherence being inter-molecular. The flakes may only be removed by abrading the surface vigorously enough to destroy the metallic film.

A solution of acrylic resin is sprayed on the bottle to form a thin film thereon. It acts to protect the gold against severe abrasion effects.

EXAMPLE 3

A slurry of gold and/or aluminum flakes is packaged in a nail polish bottle, complete with brush. The slurry is applied on the fingernail with a daubing motion. When the solvent evaporates, brilliant "silver" sparkles remain on the nail. A clear nail polish, or a clear nail polish with a tint of dye may be applied over the sparkles to increase the decorative effect.

EXAMPLE 4

A slurry of gold flakes is packaged in a squeeze-type bottle, with a narrow orifice. The slurry is squirted onto the hair, or arms, or other parts of the body and allowed to dry. This yields a metallic glitter effect that is completely smooth and non-gritty.

EXAMPLE 5

A slurry of aluminum flakes is poured on the underside of a tinted glass cake plate or candy dish. After the solvent has evaporated, a "silver" splatter design remains that is smooth to the touch, and is applied without high temperature firing. A clear coating or film is applied on the exposed underside of the design to protect it against severe abrasion.

EXAMPLE 6

Black plastic sunglass frames are plunge-dipped into an aluminum flakes slurry. The result is a "silver" spattered black sunglasses frame that is novel and attractive.

EXAMPLE 7

Aluminum flakes slurry is applied by curtain coater to aluminum foil. The result is a tone-on-tone silvery effect that is very novel and attractive.

EXAMPLE 8

Aluminum flake slurry is spattered on theatrical costume fabric. Result: a decorative metallic sparkle that is prepared economically.

The invention is not confined to precious metal flakes but other metals may be used, such as aluminum, copper, tin, bronze, and others. For example, an alloy consisting of about 100 parts of copper, 14 parts of zinc or tin and 6 parts of magnesium may be used. Other metals and alloys are also suitable, provided that they may be formed in thickness such that they adhere to the substrate by inter-molecular forces.

Various substrates are feasible, such as paper, leather, glass, fabric, metal, plastic and the like. The shape and character of the substrate may vary within wide limits. The greatest variety of articles may be decorated by the present invention, in whole or in part, in an infinite variety of patterns.

Numerous advantages are inherent in the invention:

1. The adherence of the flakes to the substrate is so great that it cannot be removed without destroying it.
2. The flake assumes the texture of the substrate. If the surface is glassy-smooth, the flake will be brilliant. If the surface has a low luster, the flake will also have a low luster. The distinctive design possibilities are many.
3. The dimensions of the object being coated are not changed. With a resinous type coating, the film thickness would add significantly to the dimension of each surface.
4. Where the resinous coating is eliminated, the cost of such coating is saved.
5. Repeated applications of the flake slurry may be made, to build up the concentration of the flake deposits as necessary or desirable. When one application is thoroughly dried, subsequent applications of solvent will not dislodge it.
6. These virtually monomolecular flakes retain their brilliance indefinitely, without further protection. This includes the aluminum flakes. In conventional resinous coatings incorporating aluminum flake pigments, the composition of the resinous portion is critical, as the aluminum may be attacked by the coating materials, darkening or destroying the aluminum.

7. It is practical, if required, to build up, by repeated applications, 100 percent metallic surface, free from any resinous coatings. This could be of importance for various technical applications such as high temperature or cryogenic or optical or high vacuum aerospace applications, where the resinous coating would be undesirable.

8. The deposited flakes are surprisingly durable. However, if additional protection is desired, a clear coating may be applied over them. This clear coating may be virtually any clear coating that is compatible with the particular process and substrate, and end-use requirement. Examples are nitrocellulose based lacquers, alkyd, acrylic, epoxy or other resin based synthetic coatings.

9. The inclusion of a transparent dye and/or pigment in the clear coating either under or over the flake deposition is one of the many means of adding to the design possibilities.

Wherever in this specification or claims the terms "nonvolatile matter" and "volatile liquid" are used, they are determined in accordance with ASTM Designation D 1353–64 entitled "Standard Method of Test for Nonvolatile Matter In Volatile Solvents For Use In Paint, Varnish, Lacquer, and Related Products."

What is claimed is:

1. A method of depositing thin metal flakes on a solid substrate which consists essentially of suspending said flakes in a volatile liquid, said liquid being free from nonvolatile matter, applying said suspension to said substrate to form a film thereon, and then evaporating said liquid, the thickness of said flakes being from about 10 to about 100 angstroms whereby they attach themselves to said substrate by intermolecular attraction.

2. A method according to claim 1 characterized in that said suspension is applied by dipping said substrate in and out of said liquid with agitation of said substrate.

3. A method according to claim 1 characterized in that said flakes are of irregular outline.

4. A method according to claim 1 characterized in that said suspension is diluted with from about 1 to 10 times its volume of said liquid prior to said application.

5. A method according to claim 1 characterized in that said evaporation is at about ambient temperatures.

6. A method according to claim 1 characterized in that said flakes are first stripped from a carrier base by subjecting said base to an excess of said organic liquid and then applied to said substrate.

7. A method according to claim 1 characterized in that said suspension contains an area of about 400 to 1000 sq. ft. of said flakes in 1 gallon of organic liquid.

8. A method according to claim 1 characterized in that said flakes are sufficiently thin so that they are slightly transparent to transmitted light.

9. A method according to claim 1 characterized in that a substantially transparent coating of lacquer or of synthetic resin resinous coating is deposited on said substrate after said evaporation.

10. A method according to claim 1 wherein said liquid is organic.

* * * * *